US008825362B2

(12) United States Patent
Kirsch

(10) Patent No.: US 8,825,362 B2
(45) Date of Patent: Sep. 2, 2014

(54) CALENDAR SHARING FOR THE VEHICLE ENVIRONMENT USING A CONNECTED CELL PHONE

(75) Inventor: David M. Kirsch, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 566 days.

(21) Appl. No.: 13/015,204

(22) Filed: Jan. 27, 2011

(65) Prior Publication Data

US 2012/0197523 A1 Aug. 2, 2012

(51) Int. Cl.
*G01C 21/00* (2006.01)
*G06Q 10/00* (2012.01)
*H04M 1/60* (2006.01)
*G01C 21/36* (2006.01)
*G06Q 10/10* (2012.01)
*H04M 1/725* (2006.01)

(52) U.S. Cl.
CPC .............. *G01C 21/362* (2013.01); *G06Q 10/00* (2013.01); *H04M 1/6091* (2013.01); *G06Q 10/109* (2013.01); *H04M 1/6083* (2013.01); *H04M 1/72566* (2013.01)
USPC ........................... 701/202; 701/430; 705/7.18

(58) Field of Classification Search
CPC .................... G05D 2201/0216; G05D 1/0246; B60K 37/06; G01C 21/26; G06Q 10/06311
USPC ......... 701/202, 24, 25, 33, 36, 430; 705/7.18; 705/7.24, 7.13–7.26; 708/112; 709/248; 715/963
See application file for complete search history.

(56) References Cited

U.S. PATENT DOCUMENTS

| 5,602,963 | A | 2/1997 | Bissonnette et al. |
| 6,009,398 | A | 12/1999 | Mueller et al. |
| 6,711,474 | B1 | 3/2004 | Treyz et al. |
| 6,928,614 | B1 | 8/2005 | Everhart |
| 7,305,343 | B2 | 12/2007 | Lui et al. |
| 7,346,374 | B2 | 3/2008 | Witkowski et al. |

(Continued)

FOREIGN PATENT DOCUMENTS

WO WO 2009/073806 6/2009

OTHER PUBLICATIONS

CompanionLink Blog, "Ford SYNC for Contact and Calendar Management by Rushang," Jan. 7, 2010, three pages. [Online] [Retrieved Feb. 17, 2010] Retrieved from the Internet <URL:http://companionlink.wordpress.com/2010/01/07/ford-sync-for-contact-and-calendar-management/.>.

(Continued)

*Primary Examiner* — Mary Cheung
*Assistant Examiner* — Rodney Butler
(74) *Attorney, Agent, or Firm* — Fenwick & West LLP

(57) ABSTRACT

A mobile device communicates with an in-vehicle system to provide a network-based calendar and related features for viewing and/or editing within a vehicle. The mobile device executes a specialized application that retrieves calendar data from one or more calendar sources in a native calendar format, and converts the calendar data to a customized vehicle format designed specifically for convenient transfer and viewing within the vehicle. The user may record spoken voice notes that can be processed to automatically create new calendar entries. An alert feature schedules visual and/or audio alerts to notify the user in advance of scheduled calendar events. When a scheduled calendar event time is reached, the in-vehicle system may automatically place a call to an event invitee or generating a route to an event destination.

21 Claims, 12 Drawing Sheets

(56) References Cited

U.S. PATENT DOCUMENTS

| | | | |
|---|---|---|---|
| 7,689,253 | B2 | 3/2010 | Basir |
| 8,346,310 | B2* | 1/2013 | Boll et al. ............. 455/569.2 |
| 8,538,992 | B1* | 9/2013 | Lawyer et al. ............. 707/790 |
| 2006/0010206 | A1 | 1/2006 | Apacible et al. |
| 2006/0217967 | A1 | 9/2006 | Goertzen et al. |
| 2007/0005368 | A1 | 1/2007 | Chutorash et al. |
| 2007/0016362 | A1* | 1/2007 | Nelson ............. 701/200 |
| 2008/0009277 | A1* | 1/2008 | Bidwell ............. 455/418 |
| 2008/0046471 | A1 | 2/2008 | Moore et al. |
| 2009/0106036 | A1 | 4/2009 | Tamura et al. |
| 2009/0157513 | A1 | 6/2009 | Bonev et al. |
| 2009/0177745 | A1 | 7/2009 | Davis et al. |
| 2009/0279483 | A1 | 11/2009 | Falchuk et al. |
| 2010/0088100 | A1 | 4/2010 | Lindahl |
| 2010/0306309 | A1 | 12/2010 | Santori et al. |
| 2011/0153140 | A1* | 6/2011 | Datta et al. ............. 701/29 |
| 2012/0029964 | A1* | 2/2012 | Tengler et al. ............. 705/7.19 |

OTHER PUBLICATIONS

CompanionLink Software, Inc., "Sync Microsoft Outlook with Google and Android-based Phones," 2010, two pages. [Online] [Retrieved May 13, 2010] Retrieved from the Internet <URL:http://www.companionlink.com/android/outlook/?pim=OL&hh=ANDROID.>.

Nuance Communications, Inc., "Jott Assistant," 2009, four pages. [Online] [Retrieved May 24, 2010] Retrieved from the Internet <URL:http://jott.comfott/jott-assistant.html.>.

reQall Inc., "reQall for iPhone," 2010, three pages.. [Online] [Retrieved May 24, 2010] Retrieved from the Internet <URL:http://www.reqall.com/about/reqall_iphone_native>.

PCT International Search Report and Written Opinion, PCT Application No. PCT/US2012/021314, May 8, 2012, seven pages.

\* cited by examiner

Today's Agenda Sept. 1, 2013

Notification 1
Notification 2                605
... (more)

Event N
Event N+1
Event N+2                     610
... (more)

CALENDAR SHARING FOR THE VEHICLE ENVIRONMENT USING A CONNECTED CELL PHONE

BACKGROUND OF THE INVENTION

1. Field of the Invention

The present invention relates to in-vehicle electronics and, more specifically, to displaying calendar information within a vehicle.

2. Description of the Related Arts

The personal electronic calendar has been represented in many forms on many devices, and its use has become increasingly widespread. The prevalence of internet connected devices such as mobile phones and connected computers has allowed for "cloud-based" calendars to become practical. In this architecture, various devices can access a cloud-based calendar and synchronize calendar data. Thus, the user can easily view, add, and edit calendar information from any connected node of the network. If a calendar item is changed at one node, the rest of the connected nodes will automatically update so that the calendar always provides current information.

Despite the widespread use of electronic calendars, current calendar systems do not provide any convenient mechanism for accessing the electronic calendar from within an automotive vehicle environment. While drivers may bring their portable devices into the car, usability problems and new safety laws make this usage undesirable. Particularly, in the automotive environment, the driver's primary focus should be on piloting the vehicle. The small screen of mobile devices and the attention required to operate them prevents a driver from being able to drive safely while accessing calendar data.

Some modern vehicles come equipped with dashboard computer systems that can provide direct access to electronic calendars. However, such systems require that the vehicle have internet connectivity, which is usually available only at considerable extra cost to the vehicle owner. Furthermore, even when an in-vehicle system is equipped with internet connectivity, current systems only provide access to calendar information that is intended for viewing on a computer screen or mobile device, rather than on an in-vehicle display. Such conventional calendar interfaces typically include complicated displays and interfaces that require substantial attention from the user to view and control. Such systems are therefore impractical for use by the driver whose attention must instead be occupied with safely navigating the vehicle.

SUMMARY OF THE INVENTION

A mobile device provides an electronic calendar for display within a vehicle. The mobile device receives calendar data from a calendar source (e.g., a network-based calendar server or a synchronized calendar stored internally by the mobile device) that stores the calendar data in a native calendar format specific to the calendar source. The mobile device converts the calendar data from the native calendar format to a vehicle calendar format suitable for transfer to an in-vehicle system. The mobile device then transfers the converted calendar data to an in-vehicle system using a short-range communication protocol.

In one embodiment, the mobile device receives the calendar data from two different calendar sources (e.g., two different network-based calendar servers or an internal calendar and a network-based calendar server), each storing the calendar data in different native formats. The mobile device aggregates the calendar data from the two different calendar sources into the vehicle format, and processes the calendar data to remove duplicate entries. Furthermore, the mobile device may time scale the received calendar data and/or apply filters to the calendar data to remove data types not suitable for use within the vehicle.

In one embodiment, the mobile device receives voice notes from the in-vehicle system comprising an audio recording of spoken words. The mobile device obtains dictated speech corresponding to the spoken words and processes the dictated speech to add or update calendar entries. Additionally, the mobile device may store the audio recordings for later retrieval.

An in-vehicle system displays and manages the electronic calendar within a vehicle environment. The in-vehicle system receives calendar data from the mobile device via the short-range communication protocol. The calendar data comprises a plurality of calendar entries. The in-vehicle system generates a user interface for displaying the calendar data. In one embodiment, the user interface comprises an events window for displaying a representation of scheduled calendar events and a notifications window for displaying a representation of calendar notifications. The in-vehicle system then outputs the user interface to an in-vehicle display.

In one embodiment, the in-vehicle system correlates the calendar entries with contacts entries and/or a points-of-interest database to find potential matches. When a scheduled event time for a calendar entry is reached, the in-vehicle system may automatically take an action based on the potential matches. For example, the in-vehicle system may automatically place a call to a contact whose name at least partially matches the name of an event invitee for the calendar event. Alternatively, the in-vehicle system may generate a route to an address of a contact or a point-of-interest that at least partially matches the event location for the scheduled calendar event.

In one embodiment, the in-vehicle system processes the calendar data and stores alerts related to scheduled calendar events. When a scheduled alert time is reached, the in-vehicle system may trigger a visual and/or audio alert. A snooze function allows the user to reschedule the alert for a later time.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 6 illustrates a user interface screen for displaying calendar entries in a vehicle in accordance with an embodiment of the invention.

DETAILED DESCRIPTION OF EMBODIMENTS

Figure 1:
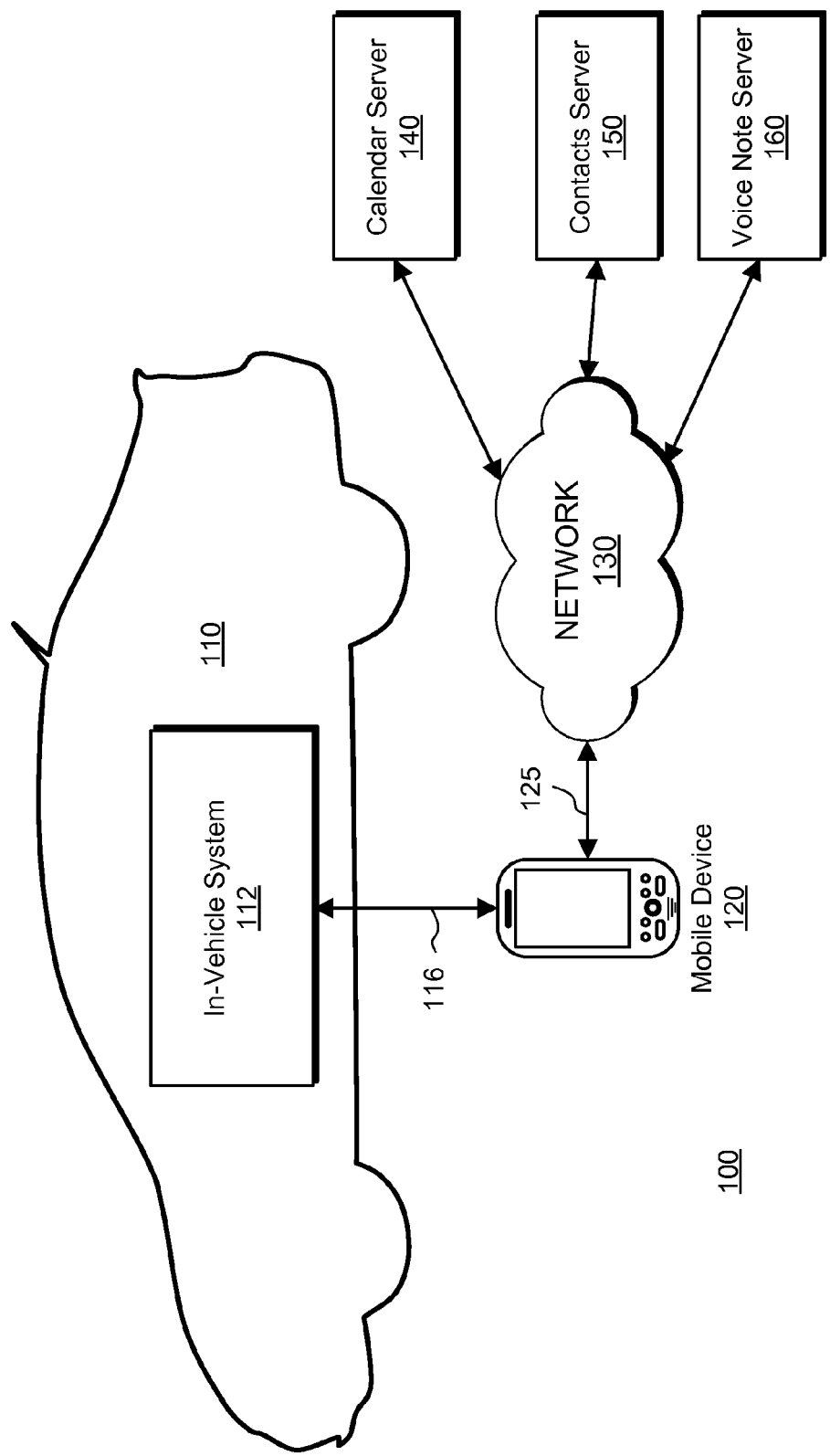
FIG. 1 illustrates a vehicle environment in accordance with an embodiment of the invention.

Embodiments are now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. The memory/storage can be transitory or non-transitory. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments are intended to be illustrative, but not limiting, of the scope of the embodiments, which are set forth in the claims.

Overview

A system, method, and computer-readable storage medium is described for obtaining, managing, and displaying an electronic calendar within a vehicle and for carrying out various features related to the electronic calendar. An application executing on a mobile device obtains calendar data pertaining to a user from one or more network-based calendar systems such as iCal, Google Calendar, Microsoft Outlook Calendar, and Yahoo Calendar. The application aggregates the calendar data and converts the calendar data to a vehicle format that is suitable for transfer and display within a vehicle. The mobile device then transfers the calendar information in the vehicle format to an in-vehicle display system. Unlike conventional calendar formats which are designed for viewing on computer screens or mobile device screens, the vehicle calendar format is designed specifically for viewing within a vehicle. Thus, the vehicle calendar format arranges the calendar information such that the user can view and/or edit calendar entries with minimal distraction. As a result, a driver can maintain focus on navigating the vehicle. Methods and example interfaces for processing and displaying calendar data within a vehicle are described in further detail below with respect to FIGS. 4-7.

Additional features related to the electronic calendar are also provided to improve the user's experience in the vehicle. First, the calendar system includes a "voice note" feature that allows the user to record a spoken message. The spoken message is then processed to extract particular words or phrases, and where appropriate, create a new calendar entry or address book entry based on the recorded voice note. This feature allows the user to easily add or modify calendar or address book entries with minimal distraction while navigating the vehicle. The voice note feature is described in further detail below with respect to FIG. 8.

Second, the system may be configured to process calendar data and take a particular action based on the content. For example, the system may process calendar entries and automatically configure a hands free telephone unit to place a call to an invitee of a scheduled calendar event, or configure a navigation unit to generate a route to an address of the scheduled calendar event. This relieves the user of having to manually perform such tasks, and thus further minimizes distractions to the driver. The calendar action feature is described in further detail below with respect to FIGS. 9-10.

Third, the system may be configured to process alerts associated with scheduled calendar events in order to notify users of a calendar event prior to, or concurrently with, its scheduled time. Alerts are displayed in a manner that is suitable for viewing and managing within a vehicle with minimal distraction to the driver. The calendar alert feature is described in further detail below with respect to FIGS. 11-12.

System Architecture

FIG. 1 illustrates an exemplary operating environment 100 for various embodiments. The operating environment 100 includes a vehicle 110 having an in-vehicle system 112, a mobile device 120, a short-range communication link 116 for communication between the in-vehicle system 112 and the mobile device 120, a network 130, a wireless networking communication link 125 between the mobile device 120 and the network 130, and various servers (e.g., a calendar server 140, a contacts server 150, and a voice note server 160) connected to the network 120. The communication links 116, 125 described herein can directly or indirectly connect these devices.

The in-vehicle system 112 comprises a computing device that may be part of the vehicle's telematics system. An embodiment of the in-vehicle system 112 is described in further detail below with reference to FIG. 3. In general, the in-vehicle system 112 is configured to display information to the user via a display screen and accept inputs from the user to control various functions. The in-vehicle system 112 includes short-range communication technology to allow the in-vehicle system 112 to exchange information with other devices, such as the mobile device 120. This allows, for example, the in-vehicle system 112 to obtain calendar information from the mobile device, display the calendar information on the in-vehicle system 112, and provide controls that enable the user to manage various calendar features.

The short-range communication link 116 between the in-vehicle system 112 and the mobile device 120 may use a wireless short-range communication technology, such as, for example, Bluetooth® technology or WiFi technology, or a wired short-range communication technology such as, for example, Universal Serial Bus (USB). The in-vehicle system 112 and mobile device 120 may connect, or pair, with each other via the short-range communication link 116.

Examples of a mobile device 120 include a cellular phone, personal device assistant (PDA), smart phone, pocket personal computer (PC), laptop computer, smart watch, or other transportable devices having a processor and communications ability. An embodiment of the mobile device 120 is described in further detail below with reference to FIG. 2. In general, the mobile device 120 is configured to execute one or more software applications that enable the mobile device 120 to communicate with the in-vehicle system 112 and carry out a number of different features and interactions that will be described in further detail below. For example, the mobile device 120 can manage and transfer calendar entries, calendar alerts, contacts data, and voice notes.

The mobile device 120 can also communicate over a network 130 with various servers such as a calendar server 140, a contacts server 150, and a voice note server 160. The network 130 may include a wireless communication network, for example, a cellular telephony network, as well as one or more other networks, such as the Internet, a public-switched telephone network (PSTN), a packet-switching network, a frame-relay network, a fiber-optic network, a Wifi network, a WiMAX network, a CDMA network, a GSM network, a 3G network, a 4G network, or other wireless networks.

The servers 140, 150, 160 comprise computing devices that communicate over the network 130 to carry out various functions and/or to store data accessible to other devices on the network 130. The calendar server 140 can comprise one or more network-based calendar servers such as, for example, an iCal Server, a Google Calendar Server, a Microsoft Exchange Server, or a Yahoo Calendar Server. The calendar server 140 stores, for a particular user, a set of calendar entries and provides calendar data pertaining to these entries to requesting devices on the network 130. Each calendar entry corresponds to a scheduled event (e.g., a meeting, an appointment, a reminder, etc.) schedule for a particular event time. Various other metadata may also be included with each calendar entry such as, for example, event title, event invitees, event description, event location, event end time, etc. Furthermore, one or more alerts may be associated with a calendar entry in order to remind the user of the event prior to, or concurrently with, the scheduled event time. Calendar entries may be added, modified, or removed by a user from any device on the network 130 that has direct or indirect access to the calendar server 140.

The contacts server 150 stores, for a particular user, a set of contacts entries and provides contacts data pertaining to these entries to requesting devices on the network 130. Each contact entry includes various metadata associated with persons or business such as, for example, name, address, phone number, email address, website, etc. The contacts server 150 may be part of the calendar server 140. For example, many network-based calendar servers such as iCal Server, Google Calendar Server, Microsoft Exchange Server, and Yahoo Calendar Server include an address book feature that may act as the contacts server 150. Alternatively, the contacts server 150 may be entirely separate from the calendar server 140.

The voice note server 160 stores and processes voice notes, i.e., a spoken memo recorded by a user. For example, the voice note server 160 may perform speech-to-text conversion on voice notes received from the mobile device 120 and return dictated text to the mobile device 120. Furthermore, the voice note server 160 may store the recorded audio files and/or deliver the audio files to the user via an email or text messaging service. Furthermore, the voice note server 160 may communicate with the calendar server 140 and the contacts server 150 to associate audio files with calendar or contacts entries.

Although only one of each type of server 140, 150, 160 is illustrated for clarity, in practice, multiple servers of each type may be present on the network 130. Furthermore, two or more of the servers 140, 150, 160 may be combined in a single computing device.

In operation, the in-vehicle system 112 and mobile device 120 communicate with each other via the short-range communication link 116. The mobile device 120 stores information received from the in-vehicle system 112, and/or may provide the information to a remote processing device, such as, for example, the calendar server 140, the contacts server 150, or the voice note server 160 via the network 130. Similarly, the mobile device 120 may store information from the remote servers 140, 150, 160, and/or may provide the information to the in-vehicle system 112. The in-vehicle system 112 thus leverages the mobile device 120 to indirectly communicate via the network 130, even if the in-vehicle system 112 is not equipped to access the network 130 directly.

Mobile Device

Figure 2:
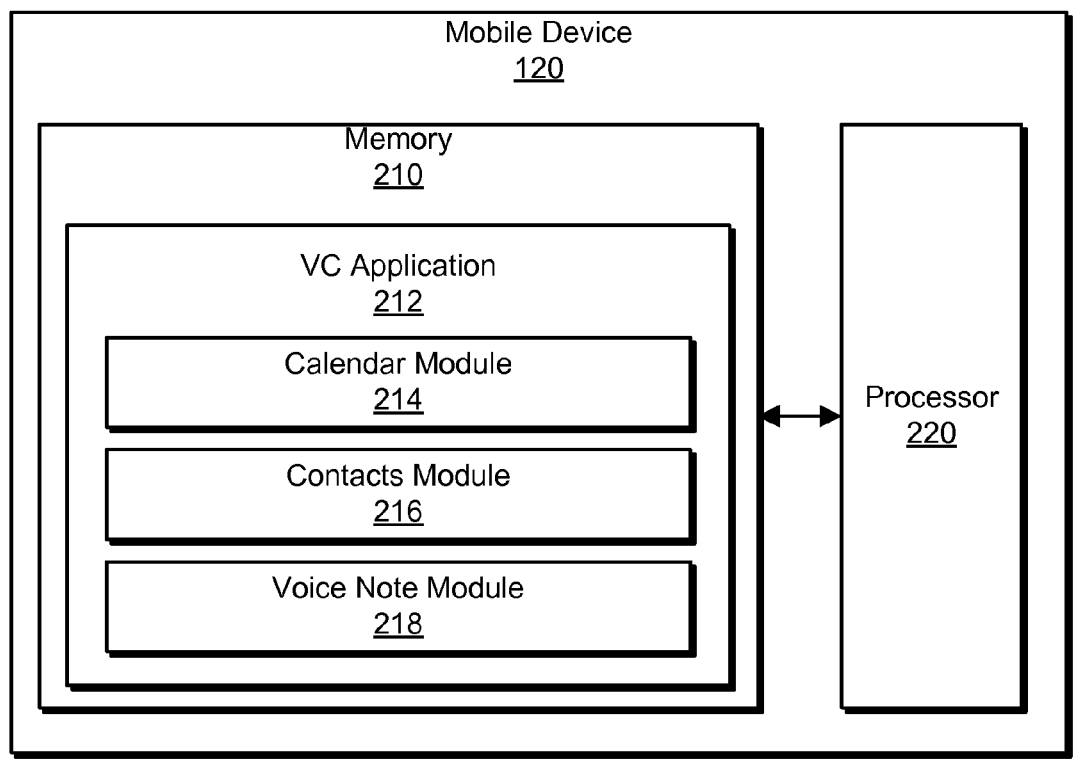
FIG. 2 is a block diagram illustrating a mobile device in accordance with an embodiment of the invention.

FIG. 2 is a block diagram illustrating an embodiment of the mobile device 120. In one embodiment, the mobile device 120 comprises a memory 210 and a processor 220. Other conventional components of the mobile device 120 such as a display, input keys, microphone, and speakers are omitted for clarity of description.

The processor 220 processes data and may comprise various computing architectures. Although only a single processor 220 is shown in FIG. 2, multiple processors may be included. The memory 210 may be a dynamic random access memory (DRAM) device, a static random access memory (SRAM) device, Flash RAM (non-volatile storage), combinations of the above, or some other memory device known in the art. The memory 210 may be used for data storage and for storing various applications that can execute on the mobile device 120. For example, the memory 210 may store iPhone™ or Android™-based applications that are available for download to the mobile device 120 via a wired or wireless system. In general, the applications include computer-executable program instructions for carrying out various functions. In operation, the instructions are loaded from the memory 210 and executed by the processor 220. In alternative embodiments, the applications can part of any of a variety of software paradigms, e.g., software as a service (SaaS), cloud computing.

In one embodiment, the memory 210 stores a vehicle connect (VC) application 212. The VC application 212 facilitates communication between the mobile device 120 and the in-vehicle system 112 and formats data for transfer to the in-vehicle system 112. The VC application 212 can communicate with the in-vehicle system 112 according to either a push or pull mechanism. Data may communicated between the mobile device 120 and the in-vehicle system 112 using, for example, a PBAP Bluetooth method or using OBEX Bluetooth protocols. The VC application 212 furthermore communicates with the various internet servers (e.g., servers 140, 150, 160) to aggregate and synchronize calendar entries and alerts, contact information, and/or voice note information.

In addition to the handling transfer of data, the VC application 212 may also manage the connection timings for access to both the network 130 and the in-vehicle system 112. For example, the VC application 212 may control the refresh timing for updating calendar and/or contacts information. In one embodiment, the VC application 212 may obtain data updates from the servers 140, 150, 160 and store them to the mobile device 120 even when the application 212 is not connected to the vehicle 110. Then, the VC application 212 can transfer these pre-acquired updates to the in-vehicle system 112 at a later time. This would allow, for example, the VC application 212 to acquire the updates whenever it is within coverage range of the network 130 (even if the mobile device 120 is not connected to the vehicle 110), and transfer the updates to the in-vehicle system 112 at a later time. When receiving data from the servers 140, 150, 160, the VC application 212 can apply filters to the data and cache the data prior to sending the information to the in-vehicle system 112. In this manner, collection and processing tasks performed by the VC application 212 may alleviate the processing requirements of the in-vehicle system 112. Furthermore, the in-vehicle system 112 need not have any direct access to the network 130.

The VC application 212 may also process data received from in-vehicle system 112. For example, the VC application 212 may receive changes to calendar or contacts data made by a user using the in-vehicle system 112, or may receive voice notes from the in-vehicle system 112 for processing. The VC application 212 compares and processes calendar and contacts modifications in order to provide calendar updates back to the calendar server 140 and provide contacts updates to the contacts server 150.

In one embodiment, the VC application 212 comprises a calendar module 214, a contacts module 216, and a voice note module 218. The calendar module 214 communicates with the calendar server 140 to obtain calendar data and transmit calendar updates back to the server 140. The calendar module 214 communicates using an Application Programming Interface (API) specific to the calendar server 140 (e.g., a CalDAV protocol or an MS Exchange protocol). The calendar module 214 may also include a calendar application that executes on the mobile device, which may include its own native calendar format. The calendar module 214 processes the calendar data to aggregate the data and convert the data from its native format specific to the calendar server 140 to a vehicle format suitable for transfer and display in the vehicle. Furthermore, the calendar module 214 communicates with the in-vehicle system 112 to transmit the formatted calendar data and receive updates.

The contacts module 216 communicates with the contacts server 150 via an API to obtain contacts data from the contacts server 150. The contacts module 216 processes and/or aggregates contacts data to convert it from its native format to a vehicle format and transmit the contacts data to the vehicle. The contacts module 216 may also receive updates from the in-vehicle system 112 and relay these updates to the contacts server 150.

The voice note module 218 receives recorded voice notes from the in-vehicle system 112 and transmits them to the voice note server 160. The voice note module 218 also receives dictated text from the voice note server 160 corresponding to the processed audio. The voice note module 218 may further process the dictated text to extract keywords or phrases and use these to create or modify calendar or contacts entries. The voice note feature is discussed in further detail below with respect to FIG. 8.

In-Vehicle System

Figure 3:
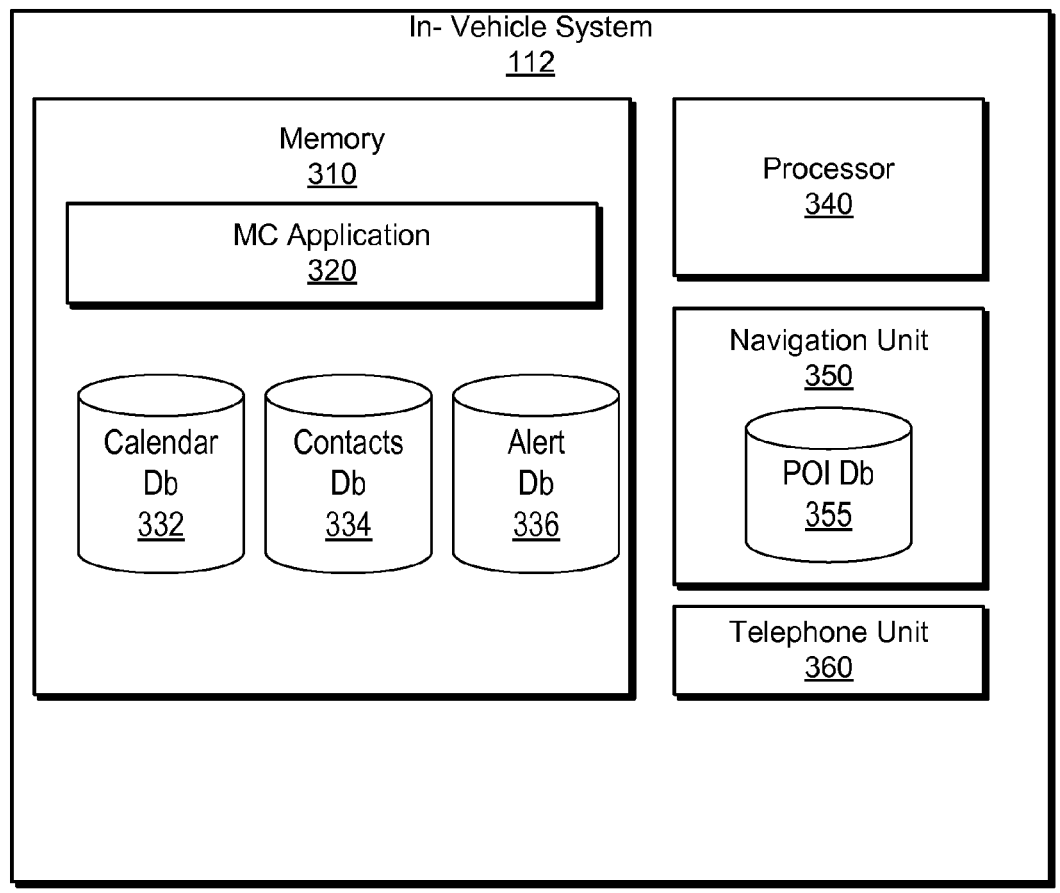
FIG. 3 is a block diagram illustrating an in-vehicle system in accordance with an embodiment of the invention.

FIG. 3 is a block diagram illustrating an embodiment of the in-vehicle system 112. In one embodiment, the in-vehicle system 112 comprises a memory 310, a processor 340, a navigation unit 350, and a telephone unit 360. Other conventional components of the in-vehicle system 112 such as a display, clock, input keys, microphone, speakers, and short-range communication unit are omitted for clarity of description.

The memory 310 stores a mobile connect (MC) application 320. The MC application 320 interfaces with the VC application 212 on the mobile device 120 using the short range communication link 116. The MC application 320 can push or pull data exchanged with the mobile device 120. Generally, data received by the MC application 212 has already been processed on the mobile device 120, thus reducing the amount of processing performed by the in-vehicle system 112. Upon receiving data, the MC application 212 stores the data (e.g., in an ASCII XML file) and accesses it as needed. The MC application 320 may receive refresh requests from a user and transmit these requests to the mobile device 120. Furthermore, the MC application 320 may receive data inputs from the user (e.g., to add, delete, or modify a calendar entry, a contacts entry, or a voice note), and transfer these updates back to the mobile device 120.

The MC application 320 generates a user interface that enables interaction between the user and the in-vehicle system 112. For example, the user interface may provide various displays, menus, controls, and other conventional user interface features. In one embodiment, the user interface displays data in a predefined format. In this embodiment, the display format is not entirely determined by the data received, but rather by a "skin" associated with the user interface. If the skin changes, the appearance changes. For example, a skin may specify display attributes such as font, font color, font size, background color, etc. Furthermore, various skins may cause different types of data to be included or excluded from display, or displayed in a different format.

The MC application 320 interacts with various databases including a calendar database 332, a contacts database 334, and an alert database 336. The calendar database 332 and contacts database 334 store calendar entries and contacts entries respectively received by the in-vehicle system 112 from the mobile device 120, or inputted or modified by the user using the in-vehicle system 112. In one embodiment, calendar and contacts entries are stored according to a data schema (e.g., an ASCII XML format) that includes various fields related to different aspects of the event. For example, a calendar data schema for each calendar entry may include the following fields: event date, event start time, event stop time, event title, event location, event description, event people, and event notification time. A contacts data schema for each contacts entry may include fields corresponding to contact name, contact address, contact phone number, contact fax number, and contact email address. One or more of the metadata fields may be blank if the data is unknown or inapplicable for the particular entry. For example, some calendar entries may omit an "event location" if the entry merely corresponds to a reminder rather than an appointment or meeting (e.g., Mom's birthday).

The MC application 320 may process calendar entries to create and manage alerts based on the event notification time and store the alerts to the alert database 336. Using the alert database 336, the MC application 320 may monitor the current time and trigger an alert when the current time matches an alert time for a scheduled alert. The notification time may be prior to the event time (e.g., to provide a reminder), or may correlate directly to the event time of a calendar entry.

In one embodiment, the MC application 320 processes entries in the calendar database 332 and contacts database 334 to compare and cross correlate entries. For example, the MC application 320 may locate matching metadata between calendar and contacts entries. This would allow, for example, the MC application 320 to automatically determine a phone number or address of an event invitee (e.g., by finding a match between the event person field of a calendar entry and the contact name field of a contacts entry). The MC application 320 could then take an action based on this match, such as placing a call to the invitee using a hands-free telephone unit 360 or generating a route to the address using the navigation unit 350. The MC application 320 may additional correlate calendar or contacts entries with points of interest (POIs) in a POI database 352 that may be included as part of the in-vehicle navigation unit 350. A processing for generating actions based on calendar events is described in more detail below with respect to FIGS. 9-10.

Operation and Use
In-Vehicle Electronic Calendar

Figure 4:
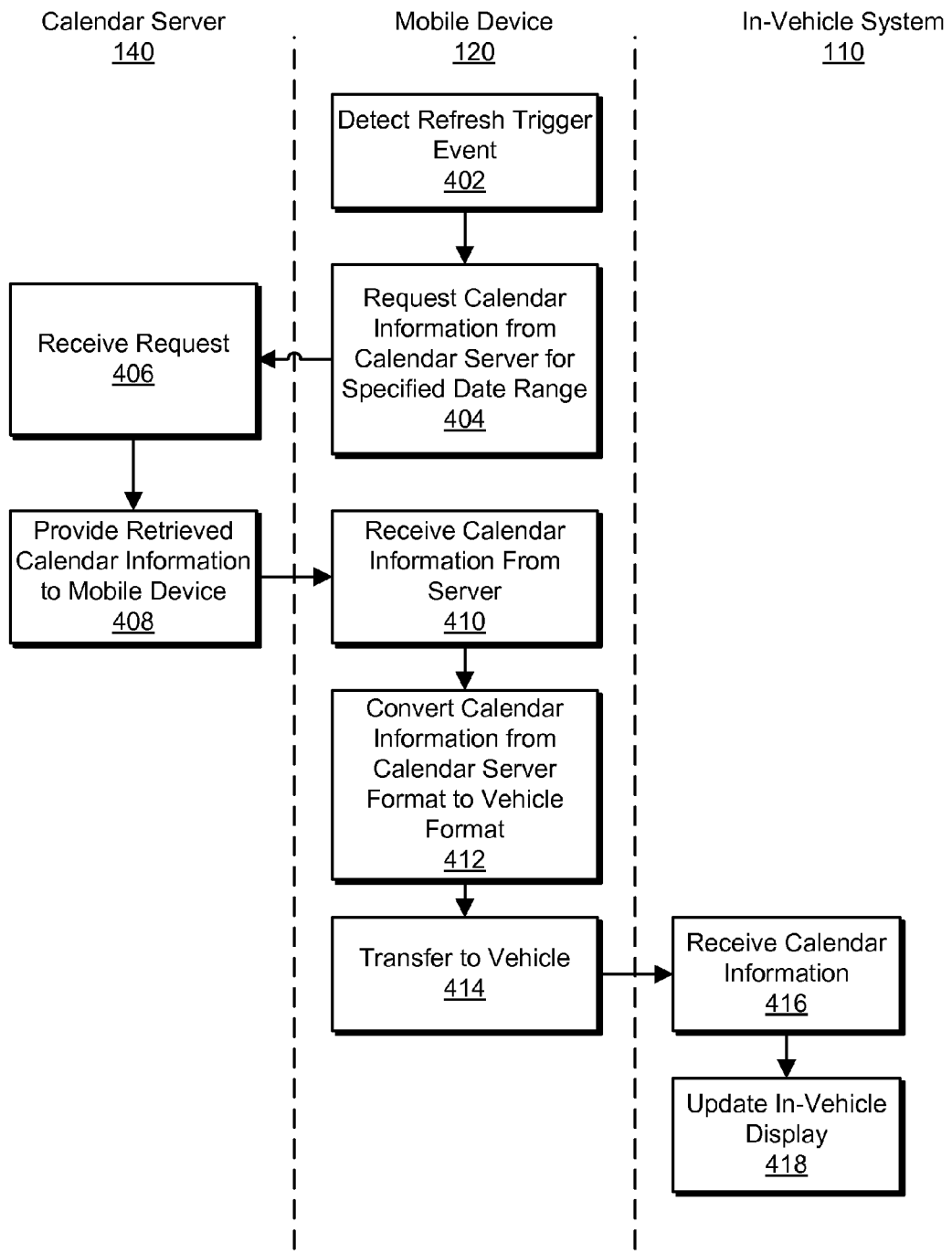
FIG. 4 is a flowchart illustrating a process for providing calendar data to a vehicle in accordance with an embodiment of the invention.

FIG. 4 illustrates an embodiment of a process for providing an electronic calendar for use within a vehicle environment 100. Various steps of the process are illustrated as being performed by the calendar server 140, the mobile device 120, and the in-vehicle system 112. In alternative embodiments, steps may be performed by different entities, or more than one entity may collectively carry out the described step.

Transfer of the calendar data to the in-vehicle system 112 is generally initiated when the mobile device 120 detects 402 a refresh trigger event. The refresh trigger event may be a manual refresh request initiated by a user, or the refresh trigger event may occur automatically when specified refresh conditions are met. For example, in one embodiment, the mobile device 120 is configured to provide a calendar refresh to the in-vehicle system 112 after a fixed amount of time has elapsed since the last refresh (e.g., every 10 minutes). In another embodiment, the refresh trigger event comprises receipt of a signal from the in-vehicle system 112 initiated by, for example, ignition of the vehicle 110 or another detectable event.

Upon detecting the refresh trigger event, the mobile device 120 requests 404 calendar information from the calendar server 140 according to a specified date range using the appropriate calendar API. Alternatively, the mobile device 120 may request the calendar information from a different calendar source, or load the information from an internally stored calendar. The request may include requests to multiple calendar servers 140 utilizing different calendar systems (e.g., iCal, MS Outlook Calendar, Google Calendar, Yahoo Calendar, etc.). The specified date range is typically substantially smaller the full range of dates stored by the calendar server 140. For example, the calendar server 140 may store calendar entries for many years before and after the current date, but the mobile device 120 may request calendar data for only the next 30 days. The requested date range may comprise a greater timeframe than the timeframe that the in-vehicle system 112 is configured to display. This would allow, for example, the mobile device 120 and/or the in-vehicle system 112 to cache the extra data until it is needed. Furthermore, this allows the in-vehicle system 112 to display "upcoming events" to the user that occur outside the standard date range of the in-vehicle calendar display, or to schedule an alert in advance of the actual event.

The calendar server 140 receives 406 the request and provides 408 the requested calendar information to the mobile device 120. The mobile device 120 receives 410 the requested calendar information from the server 140, and converts 412 the received calendar information from the calendar server format to the vehicle calendar format. A process for converting 412 the calendar information to the vehicle format is described in further detail below with reference to FIG. 5. The converted calendar information is then transferred 414 to the in-vehicle system 112. The in-vehicle system 112 receives 416 the calendar information and updates 418 the in-vehicle display accordingly.

Figure 5:
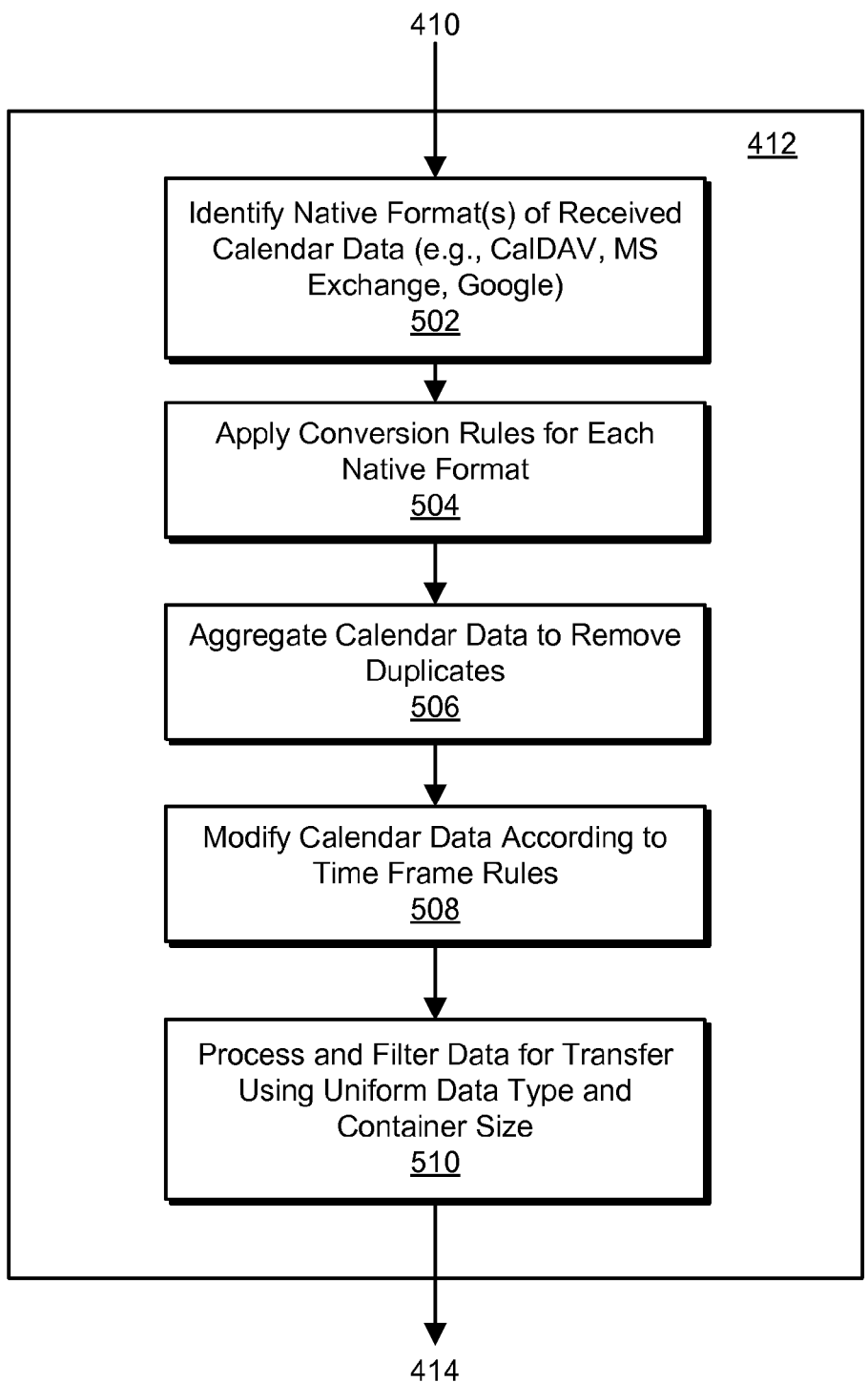
FIG. 5 is a flowchart illustrating a process for converting calendar information in accordance with an embodiment of the invention.

FIG. 5 illustrates an embodiment of a process performed by the mobile device 120 (e.g., using the calendar module 214 of the VC application 212) for converting 412 the calendar information from the calendar server format to the vehicle format (or from an internally stored calendar format to the vehicle format). The mobile device 120 identifies 502 the native calendar format(s) of the received calendar information. For example, the mobile device 120 may receive calendar information in one or more of a CalDAV format, an MS Exchange format, a Google calendar format, or another standard calendar format, or may use a format native to a calendar application that executes on the mobile device 120. The mobile device 120 then applies 504 conversion rules to the calendar information received in each of the native formats to convert all the calendar data to a common format (e.g., an ASCII XML format) such that calendar data from different calendar systems can be compared and aggregated. The mobile device 120 then aggregates 506 the calendar data to identify and remove duplicate entries. Duplicate entries may be detected by comparing metadata fields and finding matches. For example, duplicate entries may be detected if two entries have the same event start time and the same event title, event people, or event location. The mobile device 120 modifies 508 the calendar data according to predefined time frame rules. For example, the mobile device 120 may receive calendar data covering a first time frame (e.g., 30 days), but scale the data to cover only a second shorter time frame (e.g., 7 days). The mobile device 120 then processes and filters 510 the data for transfer to the in-vehicle system 112. Processing and filtering may include removing certain data types that are not suitable for display in the vehicle such as, for example, hyperlinks, unusually characters, and attachment artifacts. This step may also include processing the data into a uniform data type and container size. For example, in one embodiment, calendar entries are converted to an ASCII format for transfer to the in-vehicle system 112. In one embodiment, processing and filtering may also include characterizing calendar entries as either "events" or "notifications." Events may include, for example, meetings, appointments, or activities. Typically, calendar entries are characterized as an event if the entry specifies a set time period (e.g., between a time x and a time y, where time x is before time y). In contrast, an entry may be characterized as a notification if the entry does not specify a non-zero time period. For example, the calendar entry may indicate a start time and end time that are the same, or may not indicate any start time or end time. These types of entries may be created, for example, for all day events or as reminders about birthdays, holidays, items on a to-do list, etc. that do not specify a specific non-zero time window. In alternative embodiments, the characterization of entries as "events" or "notifications" may be performed by either the mobile device 120 or the in-vehicle system 112. In other alternative embodiments, different or additional criteria may be used for characterizing calendar entries as notifications or events.

FIG. 6 is an example of a calendar interface screen 600 for displaying calendar information within a vehicle. In the illustrated embodiment, the calendar interface screen 600 includes a notifications window 605 and an events window 610. The events window 610 comprises an ordered lists of upcoming calendar events (e.g., event N, event N+1, event N+2, etc), typically listed chronologically. The notifications window 605 provides a list of notifications. Notifications and events typically remain on display until cleared by the user, or may be configured to clear automatically after a specified time period. In one embodiment, both the notifications window 605 and the events window 610 include a "more" function that, when selected, cause the display to show additional events and/or notifications beyond those presently displayed.

Figure 7A:
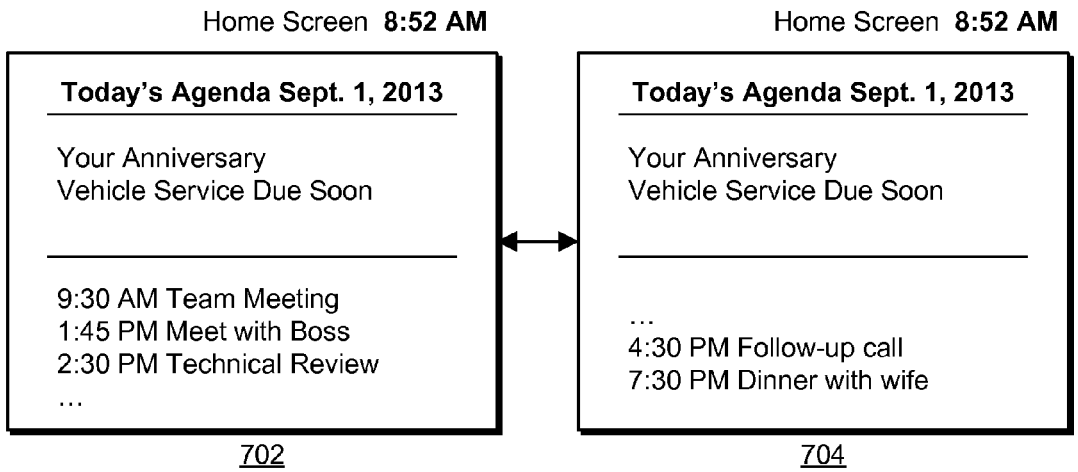
FIG. 7A illustrates a first set of user interface screens for displaying calendar entries in a vehicle in accordance with an embodiment of the invention.
Figure 7B:
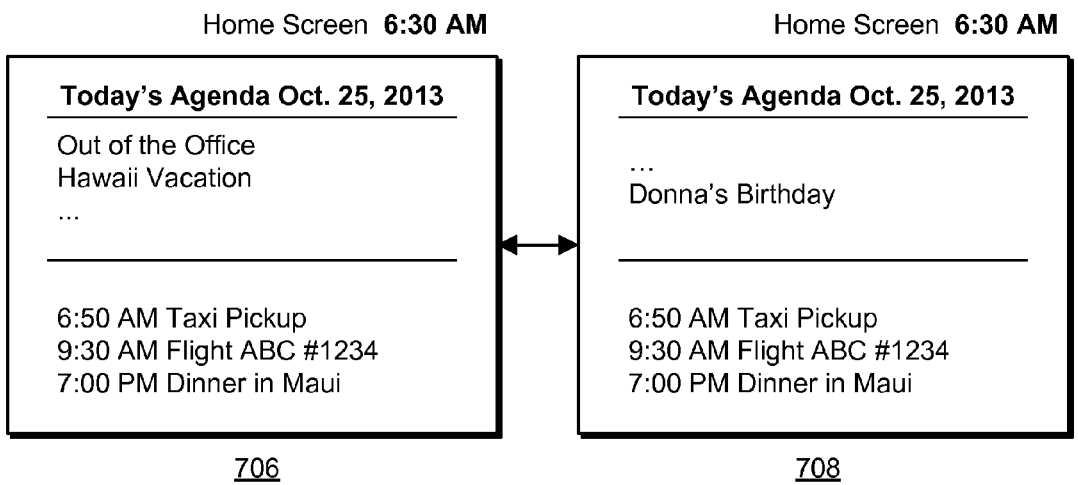
FIG. 7B illustrates a second set of user interface screens for displaying calendar entries in a vehicle in accordance with an embodiment of the invention.

FIG. 7A-B illustrate specific examples of a calendar user interface and operation of the "more" function described above. FIG. 7A illustrates a user interface screen 702 showing a set of notifications and a set of events. The " . . . " below the list of events indicates that there are more events for the day following the events presently appearing in the events window. If the user selects the "more" function (designated by " . . . "), the display is updated to show the user interface screen 704. Interface screen 704 shows the additional events for the day (e.g., 4:30 PM Follow up Call, 7:30 PM Dinner with wife). Furthermore, the " . . . " above the list of events in interface screen 704 indicates that there are more events for the day prior to the events appearing in the events window. If the user selects the more function in user interface screen 704, the display returns to user interface screen 702.

FIG. 7B illustrates a user interface screen 706 showing another set of notifications and a set of events. The " . . . " below the list of notifications indicates that there are more notifications for the day following than those presently appearing in the events window. If the user selects the "more" function (designated by " . . . "), the display is updated to show user interface screen 708. Interface screen 708 shows the additional notifications for the day (e.g., Donna's Birthday). Furthermore, the " . . . " above the list of notifications in interface screen 708 indicates that there are additional notifications for the day prior to those appearing in the notifications window. If the user selects the more function in user interface screen 708, the display returns to user interface screen 706.

Voice Note Function

In one embodiment, a voice note feature allows a user to record a voice memo from within the vehicle 110. For example, the user may want to set a reminder for a newly scheduled appointment, document a new phone number or address, or record other important information for later retrieval. Beneficially, the driver can use the voice note function with minimal distraction and can therefore maintain his focus on navigating the vehicle.

Figure 8:
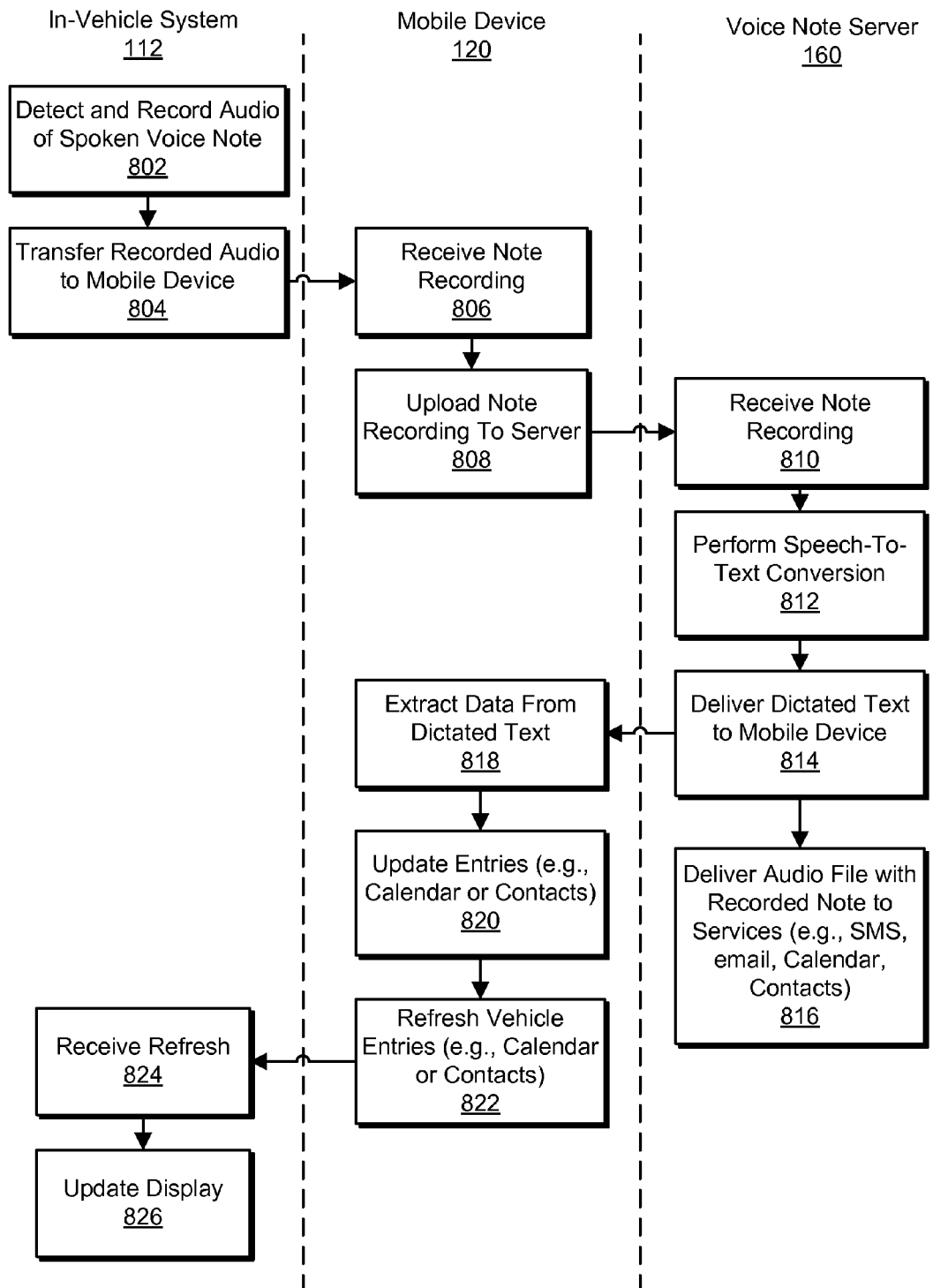
FIG. 8 is a flowchart illustrating a process for utilizing voice notes in accordance with an embodiment of the invention.

FIG. 8 illustrates an exemplary process for processing a voice note in the vehicle environment. Various steps of the process are illustrated as being performed by the voice note server 160, the mobile device 120, and the in-vehicle system 112. In alternative embodiments, steps may be performed by different entities, or more than one entity may collectively carry out the described step.

The in-vehicle system 112 detects and records 802 audio corresponding to a spoken voice note. In one embodiment, the user selects a voice note feature on the in-vehicle system 112 by, for example, manually selecting a menu option or providing a predefined voice command. The in-vehicle system 112 then prompts the user to speak and records the audio. In some embodiments, the in-vehicle system 112 divides the prompts into multiple parts to provide additional clarity. For example, for a calendar voice note, the in-vehicle 112 system may separately prompt the user to provide the event time, the event people, the event title, etc. according to the various metadata fields used for calendar entries. For a contacts voice note, the in-vehicle system 112 may separately prompt the user for the contact name, the contact address, the contact phone number, the contact email address, etc. according to the various metadata fields used for contacts entries. In other embodiments, the in-vehicle system 112 does not provide any prompt, but instead automatically begins recording when it detects the user speaking. In one embodiment, rather than the in-vehicle system 112 providing specific prompts for different metadata fields, the user may speak predefined tag words in order to separate different fields of the entry. For example, the user may speak the prompt "time" prior to speaking the time of the event, so that the system recognizes that the subsequent speech is a time entry and correlate the speech to the appropriate metadata fields. In another mode of operation, a user can edit a current calendar or contacts entry. For example, the user may select the entry to edit using menus on the in-vehicle system 112, or may use predefined voice commands to identify an entry. The user may then edit various fields using further voice commands.

Once the voice note is recorded to the in-vehicle system 112, the in-vehicle system 112 transfers 804 the recorded audio to the mobile device 120. The mobile device 120 receives 806 the voice note recording and uploads 808 the voice note recording to the voice note server 160 for processing. The voice note server 160 receives 801 the voice note and performs 812 speech-to-text conversion to convert the audio recording to text. The speech-to-text conversion may be achieved using conventional dictation software. The voice note server 160 then delivers 814 the dictated text back to the mobile device 120. Optionally, the voice note server 160 may also deliver 816 the audio file to the user via various services such as, for example, Short Message Service (SMS) or email, or the voice note server 160 may store the audio recording in association with a calendar entry or contacts entry of the user. Alternatively, the voice note server 160 may instead deliver a hyperlink to the user from which the audio file can be downloaded or streamed. This provides the user with the original sound file should the dictation not be available later on, or in case the dictation is not accurate.

The mobile device 120 receives the dictated text from the voice note server 160 and extracts 818 useful data from the dictated text. In this step, the mobile device 120 processes the dictated text to locate text relevant to a calendar entry and/or a contacts entry. For example, for a calendar voice note, the text may be searched for an event time, the participating parties, subject of the event, or other relevant fields. For a contacts voice note, the text may be searched for a contact name, a phone number, an address, or an email address, or other relevant fields. The data extraction can be simplified if the dictated text includes appropriate field tags separating the text into the various data fields.

The mobile device 120 then updates 820 the entries (e.g., calendar or contacts) according to the extracted text. These updates are then provided 822 to the vehicle in the manner described above. The in-vehicle system 112 receives 824 the updated calendar or contacts entries and updates 826 the display as appropriate.

The voice note feature thus allows a user to add or edit calendar or contacts entries within the vehicle 110 with little distraction. Furthermore, the feature maintains the original recorded speech and can provide to the user in case the dictation is not satisfactory.

Calendar Actions

Calendar entries generally identify an event's invitees and/or a location of the event. Commonly, the user will want to contact the invitees shortly before the scheduled event time, find an address of an invitee where the event may be held, or find a different address of the event referenced in the calendar entry. Thus, in one embodiment, the in-vehicle system 112 includes a feature for performing an action based on calendar metadata at the scheduled time of the event or at the scheduled notification time prior to the event. For example, the in-vehicle system 112 can dial a phone number of an invitee using the hands-free telephone unit 360. Additionally, the in-vehicle system 112 can input the address to the navigation unit 350 in order to generate a route to the meeting location.

In order to determine the desired action, the in-vehicle system 112 performs a comparison and cross-linking of information between the calendar database 332 and the contacts database 334. Optionally, the in-vehicle system 112 may also correlate calendar and contacts data with POIs stored in the POI database 352 of the navigation unit 350. By automatically performing this cross-correlation of data, the user is relieved of manually performing this task and can therefore better focus on safely driving the vehicle.

Figure 9:
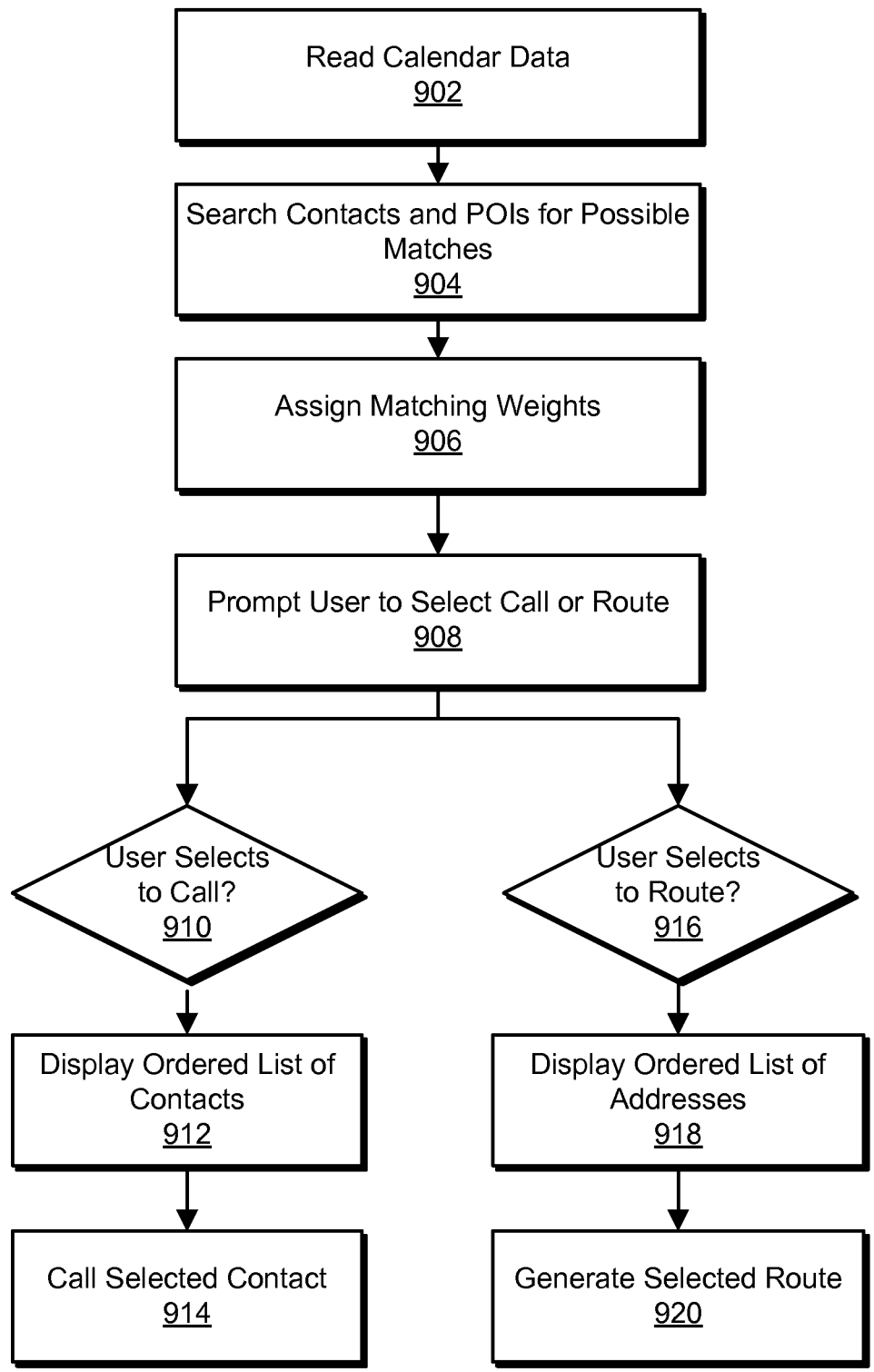
FIG. 9 is a flowchart illustrating a process for taking actions based on calendar entries in accordance with an embodiment of the invention.

FIG. 9 illustrates one embodiment of a process performed by the in-vehicle system 112 (e.g., using the MC application 320) for generating an action based on a calendar entry. The in-vehicle system 112 reads 902 the calendar data for a calendar entry. The in-vehicle system 112 then searches 904 the contacts database 334 and the POI database for possible matches to terms in the calendar entry. Matching weights are then assigned 906 to the matches based on the strength of the match. Various types of matching and ranking metrics may be used. For example, in one embodiment, a fuzzy search method is used that applies weights based on a similarity between text fields. Then, the matching metric is compared to a threshold, and entries above the threshold are accepted as matches.

The in-vehicle system 112 prompts 908 the user to select to call a contact or route to a destination. If the user selects 910 to call a contact, the in-vehicle system 112 displays 912 a list of potential contact matches ordered according to the matching weights (e.g., beginning with the strongest match). The user may then select a contact to call, and the telephone system 360 places the call 914 to the selected contact. In one embodiment, the list of matches may be limited those exceeding a minimum matching weight. Furthermore, if only one contact exceeds the minimum matching weight, the in-vehicle system 112 may automatically call the contact without first displaying the list.

Alternatively, if the user selects 916 to generate a route, the in-vehicle system display 918 a list of potential location matches ordered according to the matching weights (e.g., beginning with the strongest match). The location matches may either be an address associated with a matching contact from the contacts database 334 or a POI (or address of a POI) from the POI database 352. The user may then select an address or POI, and the navigation unit 350 generates 920 a route to the selected destination. In one embodiment, the list of matches may be limited those exceeding a minimum matching weight. Furthermore, if only one destination exceeds the minimum matching weight, the in-vehicle system 112 may automatically configure the navigation unit 350 to generate a route to the destination without first displaying the list.

In one embodiment, steps 902-908 are pre-processing steps that occur in advance of the scheduled event time. For example, steps 902-908 may be performed whenever calendar updates are received from the mobile device 120. Then steps 910-920 occur when a scheduled event time is reached, or a scheduled notification time prior to the event time. Alternatively, the in-vehicle system 112 may perform all steps (including steps 902-908) for each calendar entry as the calendar events occur rather than pre-processing them in advance. In yet another embodiment, one or more of the steps 902-920 may instead be performed by the mobile device 120.

Figure 10:
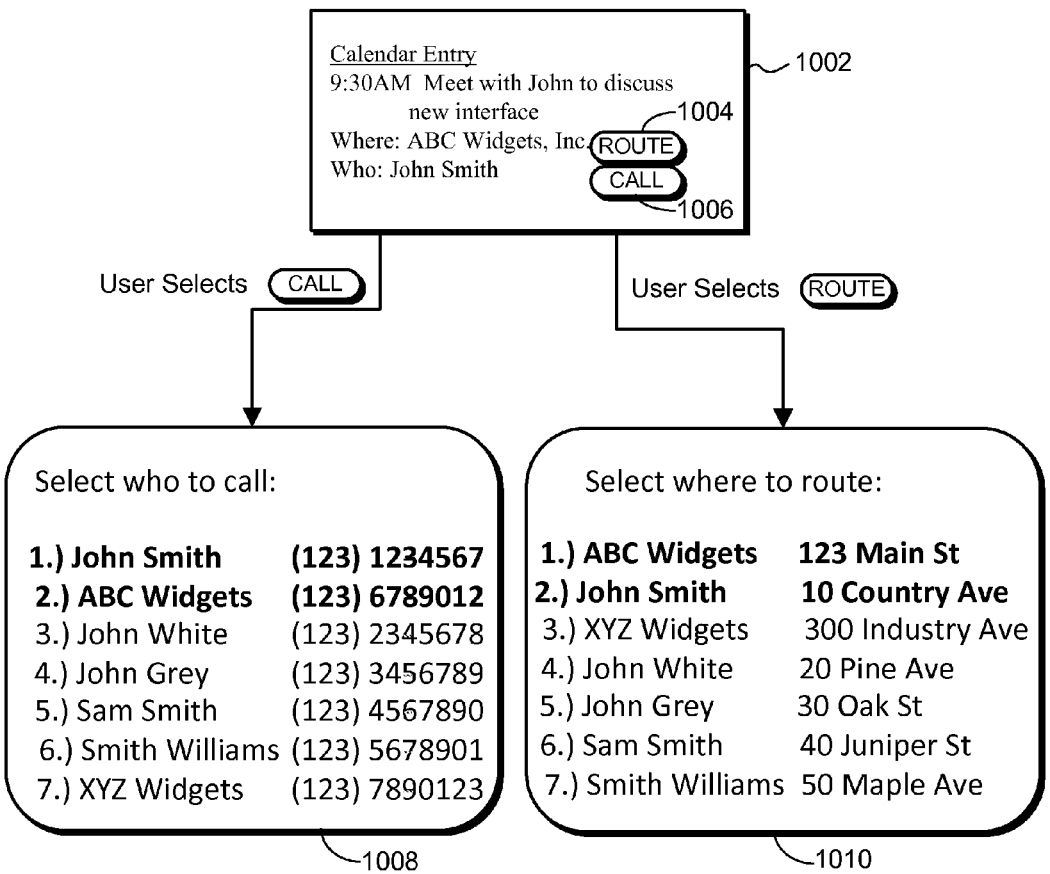
FIG. 10 illustrates user interface screens for taking actions based on calendar entries in accordance with an embodiment of the invention.

FIG. 10 illustrates examples of user interface screens that the in-vehicle system 112 may display while executing the process described above. Interface screen 1002 comprises a display screen associated with a calendar entry. This calendar entry may be displayed, for example, when the user selects to view the entry from a list of calendar entries, or the entry may be displayed automatically when the notification time or event time is reached. The interface screen 1002 includes a route option 1004 and a call option 1006. If the user selects the call option 1006, interface screen 1008 is displayed. Interface screen 1008 shows a list of contacts (e.g., name and phone number) matching at least a portion of the calendar data. Here, items (1) and (2) in interface screen 1008 are displayed in bold indicating that those contacts are exact matches with the calendar metadata. If the user instead selects the route option 1004, interface screen 1010 is displayed. Interface screen 1010 shows a list of destinations (e.g., name and addresses) matching at least a portion of the calendar data. Items (1) and (2) in interface screen 1010 are displayed in bold indicating that they are those destinations are exact matches with the calendar metadata.

Calendar Alerts

The in-vehicle system 112 may include a calendar alert feature that provides visual alerts and/or audible alarms to notify the user about calendar events. Alerts are useful, for example, to remind the user of an upcoming event or the need to perform some action (e.g., an item on a "to-do list"). In one embodiment, calendar alerts are generated by the in-vehicle system 112 from calendar data stored in the vehicle's calendar database 332. Alternatively, the alerts may be generated by the mobile device 120 and transmitted to the vehicle system 112 as they occur. Unlike conventional calendar alerts which are designed for display on computer screens or mobile devices, the in-vehicle system 112 instead generates calendar alerts specifically designed for the vehicle environment. As a result, the alerts can be viewed and managed by the driver with minimal distraction.

Figure 11:
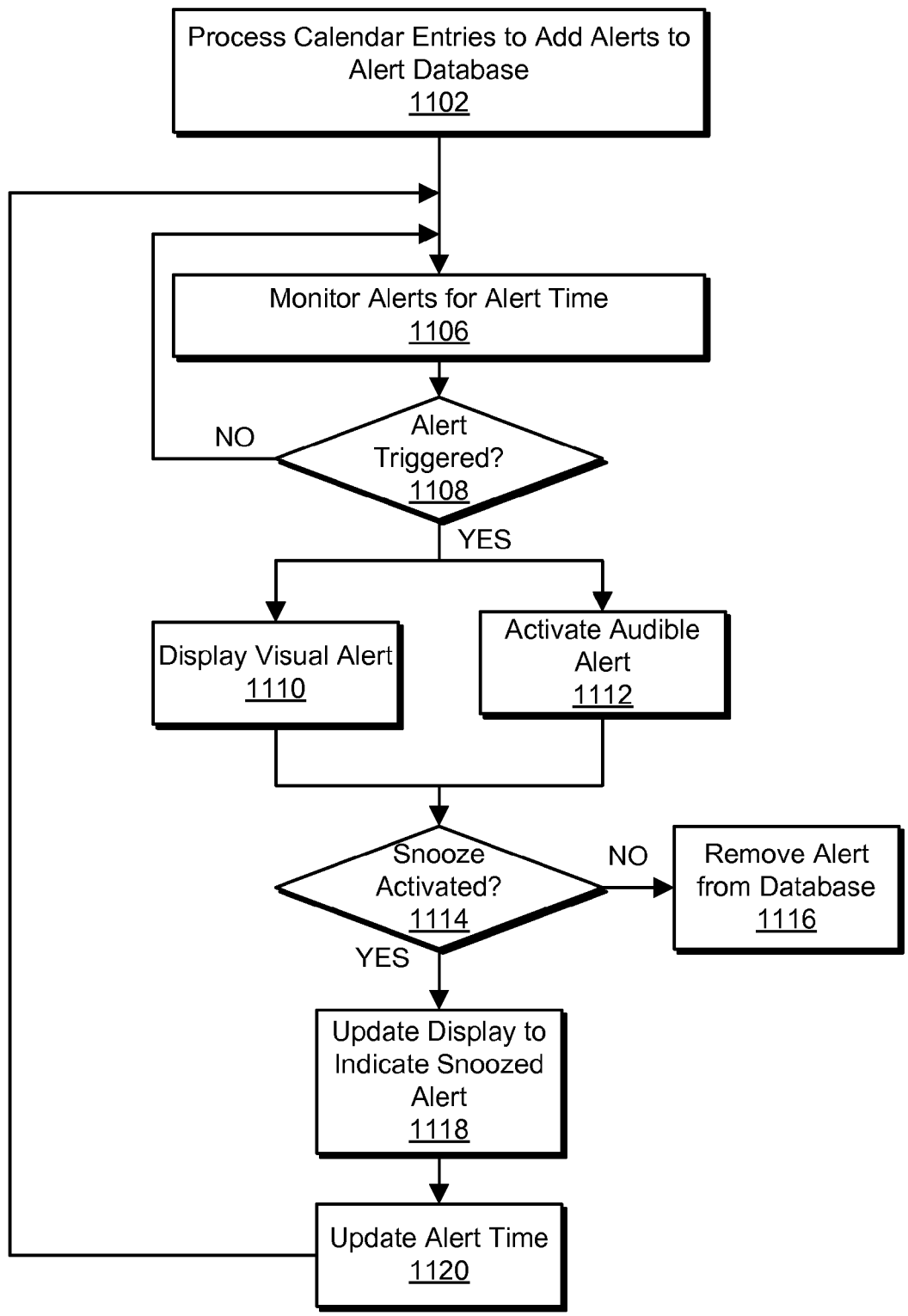
FIG. 11 is a flowchart illustrating a process for managing calendar alerts in accordance with an embodiment of the invention.

FIG. 11 illustrates an embodiment of a process for providing in-vehicle alerts based on calendar entries. The in-vehicle system 112 processes 1102 calendar entries in the calendar database 332 to add alerts to the alert database 336. Each entry in the alert database 336 may include various metadata fields that include information related to the alert such as, for example, alert time, alert message, alert audio, and alert action. The alert time field indicates the time (e.g., day, hour, minute) at which the alert will be triggered. Alert times can be extracted from the notification time included with calendar entry. For example, an alert may be set to trigger 15 minutes before an event time, 30 minutes before an event time, 24 hours before an event time, or another fixed time period. Alternatively, the alert may be set to trigger at the same time as the event time for the calendar entry. The alert message field indicates a message that will be displayed when the alert is triggered. This may correspond to information in the related calendar entry, or may be an entirely different message. The alert audio field identifies an audible alert, if any, that will be played when the alert triggers. The user may choose the alert audio when setting the alert from one of a stored set of possible audible alerts, or a default alert audio may be used. The alert action field identifies an action to be taken when the alert is triggered such as, for example, dialing a particular phone number, generating a route to a particular destination, or loading a particular website.

The in-vehicle system 112 continuously monitors 1106 the current time to determine when the current time matches an alert time in one of the stored alerts in the alert database 336. If the current time does not match any alert time, the in-vehicle system 112 continues monitoring 1106. If an alert is triggered 1108 (i.e., when the current time matches an alert time), the in-vehicle system 112 displays 1110 a visual alert (which may include the alert message) and activates 1112 an audible alert (which may include the selected alert audio). When an alert is activated, the user may have the option of selecting a snooze function. The snooze function allows the user to delay the alert for a predefined time period (i.e., a "snooze time"). The snooze time may be a default value (e.g., 10 minutes) or the in-vehicle system 112 may present the user the option of selecting a desired snooze time. If the snooze function is not activated at step 1114, the alert is completed and the alert is removed 1116 from the alert database 336. If the snooze function is active at step 1114, the display is updated 1118 to indicate that the alert has been "snoozed." The in-vehicle system 112 then updates 1120 the alert time for the snoozed alert according to the snooze time (e.g., by adding the snooze time to the previously configured alert time). The in-vehicle system 112 then continues to monitor 1106 alerts. This includes monitoring for when the current time matches the updated alert time of a snoozed alert.

Figure 12A:
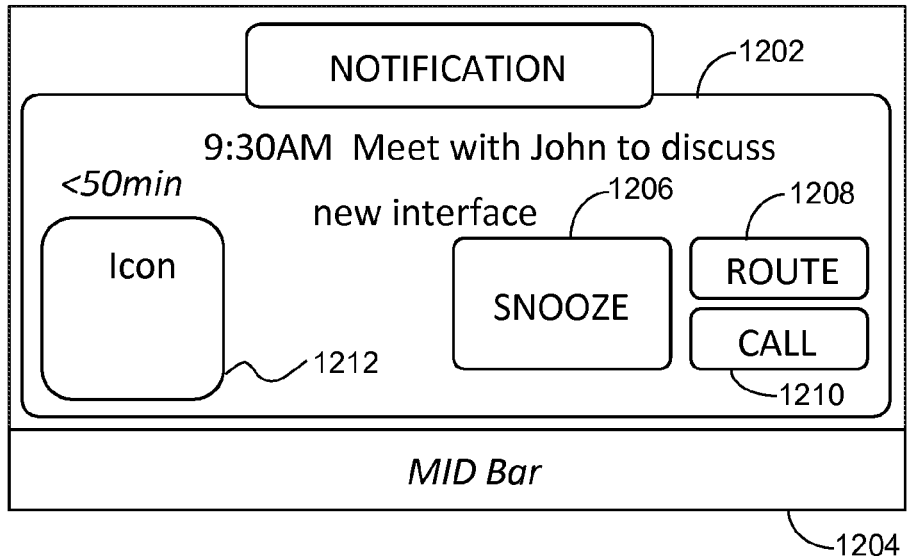
FIG. 12A illustrates a first user interface screen for managing a calendar alert in a vehicle in accordance with an embodiment of the invention.
Figure 12B:
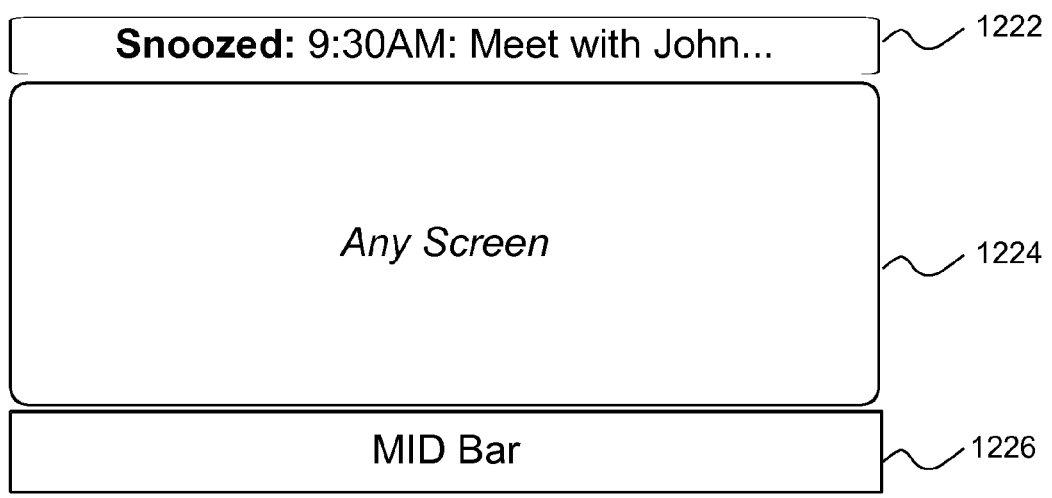
FIG. 12B illustrates a second user interface screen for managing a calendar alert in a vehicle in accordance with an embodiment of the invention.

FIGS. 12A and 12B illustrate examples of user interface screens displayed by the in-vehicle system 112 when carrying out the alert process described above. FIG. 12A illustrates an example of an interface screen 1204 that is displayed when an alert is triggered. A notification window 1202 includes information from the calendar entry including the time and subject of the scheduled event (in this example, "9:30 AM: Meet with John to discuss new interface"). The notification window 1202 also indicates an estimated time until the scheduled event (in this example, less than 50 minutes). The notification window 1202 includes a snooze button 1206, that when selected, activates the snooze function described above. Furthermore, the notification window 1202 includes route button 1208 and call button 1210 that when selected, causes the in-vehicle system 112 to take the selected action as described above. Additionally, the notification window 1202 includes an icon 1212 and a Multiple Information Display (MID) bar 1204. In one embodiment, the notification window 1202 automatically pops up on the display screen when the alert is triggered. The icon 1212 can comprise any icon designated by the in-vehicle system 1212 or by the notification parameters. For example, in the case of an alert for a meeting, the icon 1212 could symbolize a meeting. In the case of an alert for a person's birthday, the icon 1212 could be a picture of the person. The MID bar 1204 typically displays information for various gauges such as odometer information and other related item. In one embodiment, the MID bar 1204 may be displayed on any of the display screens so that the information is continuously available to the user.

FIG. 12B illustrates an example of an interface screen that is displayed when the user selects the snooze function. A notification bar 1222 is displayed indicating that a previous alert has been snoozed. In one embodiment, the notification bar 1222 could instead display the next scheduled event as a convenient reminder to the user. While the alert is snoozed, the user can view other screens in the "any screen" window 1224 (e.g., audio control screen, navigations screen, etc.) In one embodiment, when the snooze function is activated, the any screen window 1224 automatically returns to the screen previously displayed prior to activation of the alert. The MID bar 1226 is also displayed as described above.

The features described herein thus allow a user to view and manage an electronic calendar and related functions within a vehicle 110. Beneficially, by utilizing a mobile device 120 connected to the vehicle 110, the in-vehicle system 112 itself need not be equipped with direct internet connectivity, and much of the data processing can be performed by the VC application 212 on the mobile device 120 rather than by the in-vehicle system 112. This therefore reduces the cost of the vehicle 110 to buyers, and allows current vehicle owners to simply download an application to their mobile device 120 without having to install a new in-vehicle system 112. Furthermore, because the calendar data and related features are specifically formatted for use in a vehicle, a driver can safely view and manage the electronic calendar with minimal distraction.

Upon reading this disclosure, those of skill in the art will appreciate still additional alternative designs for calendar sharing in the vehicle environment using a connected phone, having the features described herein. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A system for managing an electronic calendar within a vehicle environment, the system comprising:
   a short-range communication device for receiving calendar data comprising a plurality of calendar entries from a mobile device via a short-range communication protocol, characterizing a first set of the calendar entries as being scheduled calendar events responsive to each of the first set of calendar entries specifying a non-zero time window, and characterizing a second set of the calendar entries as being calendar notifications responsive to each of the second set of calendar entries being associated with a particular date without specifying a non-zero time window;
   an in-vehicle computing system to generate a user interface for displaying the calendar data, the user interface comprising an events window for displaying a representation of the scheduled calendar events, and a notifications window for displaying a representation of the calendar notifications, the notifications window in a separate portion of the user interface than the events window, the notifications window displaying a limited number of notifications and a first indicator that when selected causes the user interface to display additional notifications, and the events window displaying a limited number of events and a second indicator that when selected causes the user interface to display additional events; and
   an in-vehicle display for displaying the user interface showing the received calendar data.

2. A non-transitory computer-readable storage medium storing instructions executable by a processor, the instructions when executed cause the processor to perform steps including:
   receiving first calendar data from a first calendar source the first calendar source storing the first calendar data in a first native calendar format specific to the first calendar source;
   receiving second calendar data from a second calendar source the second calendar source storing the second calendar data in a second native calendar format specific to the second calendar source, the second native calendar format different than the first native calendar format;
   identifying and removing duplicate calendar entries that appear in both the first calendar data and the second calendar data to generate non-duplicate calendar data;
   filtering the non-duplicate calendar data to remove at least one of hyperlinks, special characters, and attachments;
   processing the non-duplicate calendar data to characterize a first set of calendar entries as being scheduled calendar events responsive to each of the first set of calendar entries specifying a non-zero time window, and to characterize a second set of calendar entries as being calendar notifications responsive to each of the second set of calendar entries being associated with a particular date without specifying a non-zero time window; and
   converting the non-duplicate calendar data to generate converted calendar data in a vehicle calendar format suitable for transfer to an in-vehicle system, the converted calendar data indicating whether each entry corresponds to an scheduled calendar event or a calendar notification; and
   transferring, using a short-range communication protocol, the converted calendar data from the mobile device to the in-vehicle system.

3. A method for providing an electronic calendar for display within a vehicle, the method comprising:
   receiving, by a mobile device, first calendar data from a first calendar source the first calendar source storing the first calendar data in a first native calendar format specific to the first calendar source;
   receiving, by the mobile device, second calendar data from a second calendar source the second calendar source storing the second calendar data in a second native calendar format specific to the second calendar source, the second native calendar format different than the first native calendar format;
   identifying and removing duplicate calendar entries that appear in both the first calendar data and the second calendar data to generate non-duplicate calendar data;
   filtering the non-duplicate calendar data to remove at least one of hyperlinks, special characters, and attachments;
   processing the non-duplicate calendar data to characterize a first set of calendar entries as being scheduled calendar events responsive to each of the first set of calendar entries specifying a non-zero time window, and to characterize a second set of calendar entries as being calendar notifications responsive to each of the second set of calendar entries being associated with a particular date without specifying a non-zero time window; and
   converting the non-duplicate calendar data to generate converted calendar data in a vehicle calendar format suitable for transfer to an in-vehicle system, the converted calendar data indicating whether each entry corresponds to an scheduled calendar event or a calendar notification; and
   transferring, using a short-range communication protocol, the converted calendar data from the mobile device to the in-vehicle system.

4. The method of claim 3, wherein the first calendar source comprises a first network-based calendar server and the second calendar source comprises a second network-based calendar server.

5. The method of claim 3, wherein the first calendar source comprises a first network-based calendar server and the second calendar source comprises a calendar application executable by the mobile device.

6. The method of claim 3, further comprising:
   scaling the non-duplicate calendar data to extract calendar entries falling within a predefined time range, the predefined time range smaller than a time range of the non-duplicate calendar data generated from first calendar data in the first native calendar format and the second calendar data in the second native calendar format.

7. The method of claim 3, further comprising:
receiving, from the in-vehicle system, updated calendar data reflecting a change to a calendar entry made using the in-vehicle system, the updated calendar data in the vehicle calendar format;
converting the updated calendar data in the vehicle calendar format to the first native calendar format; and
providing the updated calendar data to the first calendar source in the first native calendar format.

8. The method of claim 3, further comprising:
detecting a refresh trigger event; and
responsive to the detecting the refresh trigger event, requesting a refresh of the first calendar data from the first calendar source.

9. The method of claim 3, further comprising:
receiving a voice note from the in-vehicle system, the voice note comprising an audio recording of spoken words;
obtaining dictated text comprising a speech-to-text conversion of the spoken words;
creating a new calendar entry scheduling an event described in the dictated text; and
transferring the new calendar entry to the in-vehicle system.

10. The method of claim 8, wherein detecting the refresh trigger event comprises receiving a signal from the in-vehicle system indicating vehicle ignition.

11. The method of claim 8, wherein detecting the refresh trigger event comprises detecting that a predefined time period has elapsed since a last refresh.

12. The method of claim 11, wherein obtaining the dictated text comprises:
uploading the voice note to a voice note server for processing; and
receiving the dictated text from the voice note server.

13. A method for managing an electronic calendar within a vehicle environment, the method comprising:
receiving, by an in-vehicle computing system, calendar data comprising a plurality of calendar entries, the calendar data received from a mobile device via a short-range communication protocol;
processing the calendar entries to characterize a first set of calendar entries as being scheduled calendar events responsive to each of the first set of calendar entries specifying a non-zero time window, and to characterize a second set of calendar entries as being calendar notifications responsive to each of the second set of calendar entries being associated with a particular date without specifying a non-zero time window;
generating, by the in-vehicle computing system, a user interface for displaying the calendar entries, the user interface comprising an events window for displaying a representation of the scheduled calendar events, and a notifications window for displaying a representation of the calendar notifications, the notifications window in a separate portion of the user interface than the events window, the notifications window displaying a limited number of notifications and a first indicator that when selected causes the user interface to display additional notifications, and the events window displaying a limited number of events and a second indicator that when selected causes the user interface to display additional events; and
displaying the user interface using an in-vehicle display device of the in-vehicle computing system.

14. The method of claim 13, further comprising:
correlating the calendar entries with contacts entries to locate potential matches between metadata of the calendar entries and metadata of the contacts entries; and
responsive to reaching a scheduled time for a calendar entry, initiating an action using the potential matches.

15. The method of claim 13, further comprising:
storing to an alert database one more scheduled calendar alerts, each calendar alert associated with a calendar entry and comprising a scheduled alert time;
determining when a current time matches the scheduled alert time;
responsive to the current time matching the scheduled alert time, triggering an alert.

16. The method of claim 14, wherein initiating the action comprises:
displaying a list of contact entries that include a contact name matching at least a portion of an event invitee in the calendar entry or a contact address matching at least a portion of the event location in the calendar entry.

17. The method of claim 14, wherein initiating the action comprises:
displaying a list of point of interest that match at least a portion of an event location in the calendar entry; and
responsive to a receiving a selection of one of the list of points of interest, generating a navigation route to an address associated with the selected point of interest.

18. The method of claim 15, wherein triggering the alert comprises at least one of:
displaying a visual message on the vehicle display; and
activating an audible alert.

19. The method of claim 15, further comprising:
receiving a snooze request for the triggered alert;
updating the alert time by adding a predefined snooze time to the alert time; and
storing the updated alert time to the alert database.

20. The method of claim 16, further comprising:
responsive to a receiving a selection of one of the list of contact entries, placing a telephone call using a telephone number associated with the selected contact entry.

21. The method of claim 16, further comprising:
responsive to a receiving a selection of one of the list of contact entries, generating a navigation route to an address associated with the selected contact entry.

* * * * *